US010673559B2

(12) United States Patent
Mohammadi (10) Patent No.: US 10,673,559 B2
(45) Date of Patent: Jun. 2, 2020

(54) OPTIMAL PREAMBLE LENGTH AND DETECTION THRESHOLD

(71) Applicant: Silicon Laboratories Inc., Austin, TX (US)

(72) Inventor: Mohammad Sadegh Mohammadi, Lyngby (DK)

(73) Assignee: Silicon Laboratories, Inc., Austin, TX (US)

( * ) Notice: Subject to any disclaimer, the term of this patent is extended or adjusted under 35 U.S.C. 154(b) by 62 days.

(21) Appl. No.: 16/059,202

(22) Filed: Aug. 9, 2018

(65) Prior Publication Data

US 2020/0052814 A1 Feb. 13, 2020

(51) Int. Cl.
*H04L 1/00* (2006.01)
*H04L 1/20* (2006.01)

(52) U.S. Cl.
CPC ............ *H04L 1/0039* (2013.01); *H04L 1/203* (2013.01)

(58) Field of Classification Search
CPC .............................. H04L 1/0039; H04L 1/203
See application file for complete search history.

(56) References Cited

U.S. PATENT DOCUMENTS

| | | | |
|---|---|---|---|
| 5,272,728 A | 12/1993 | Ogawa | |
| 5,953,378 A * | 9/1999 | Hotani | H04J 3/0608 375/341 |
| 6,724,829 B1 * | 4/2004 | Tzukerman | H04L 25/03866 375/295 |
| 7,046,700 B1 * | 5/2006 | Roberts | H04J 3/0605 370/470 |
| 7,738,355 B1 | 6/2010 | Goh et al. | |
| 2002/0178410 A1 * | 11/2002 | Haitsma | G06K 9/00744 714/709 |
| 2006/0133228 A1 * | 6/2006 | Nagai | G11B 7/24082 369/44.13 |
| 2007/0189237 A1 | 8/2007 | Jaatinen et al. | |
| 2009/0190492 A1 * | 7/2009 | Khayam | H04L 1/0072 370/252 |
| 2011/0004809 A1 * | 1/2011 | Hirth | H03M 13/333 714/777 |

(Continued)

FOREIGN PATENT DOCUMENTS

WO 2007/010331 A1 1/2007

*Primary Examiner* — Will W Lin
(74) *Attorney, Agent, or Firm* — Nields, Lemack & Frame, LLC (57) ABSTRACT

A system and method for determining an optimal configuration of the preamble for use in a wireless network is disclosed. The system and method use the calculated or given channel bit error rate to determine this configuration. There are two important parameters associated with the preamble; its length and the detection threshold. The detection threshold is a measure of how many bits can be incorrect while still detecting the preamble. The optimal value of the detection threshold sets a trade off between false positives and false negatives. In some embodiments, the system uses the channel bit error rate to determine these parameters. In certain embodiments, the detection threshold can be implemented by the receiver without knowledge of the transmitter. By optimizing the configuration of the preamble, the reliability of communications is minimally impacted while power consumption of the network devices is reduced.

18 Claims, 11 Drawing Sheets

(56) References Cited

U.S. PATENT DOCUMENTS

| | | | | |
|---|---|---|---|---|
| 2012/0239256 A1* | 9/2012 | Hammerschmidt | .. | H04L 1/0061 701/45 |
| 2013/0315152 A1* | 11/2013 | Ratasuk | ................ | H04W 76/14 370/329 |
| 2015/0078477 A1* | 3/2015 | Hong | .................. | H04L 27/2602 375/295 |
| 2015/0254338 A1* | 9/2015 | Cheluvaraja | ............ | G10L 25/51 707/661 |
| 2016/0381596 A1* | 12/2016 | Hu | ...................... | H04B 7/18504 370/236 |
| 2017/0149599 A1* | 5/2017 | Kang | .................... | H04B 1/707 |
| 2017/0331670 A1* | 11/2017 | Parkvall | ............ | H04W 52/0245 |
| 2018/0294959 A1* | 10/2018 | Traynor | ................ | H04L 9/0844 |
| 2018/0351573 A1* | 12/2018 | Kessel | ................ | H03M 13/256 |

* cited by examiner

OPTIMAL PREAMBLE LENGTH AND DETECTION THRESHOLD

FIELD

This disclosure describes systems and methods for determining and utilizing optimal frame preamble lengths and frame detection thresholds in a wireless system.

BACKGROUND

In wireless networks, data is communicated between devices using packets of information which are conveyed through frames. The frame includes a header, which identifies the source and destination addresses and potentially other PHY settings, and a data payload. Additionally, for the purpose of frame detection and timing synchronization, each frame begins with a specific pattern of symbols that is known for the receiver. This specific pattern of symbols may be referred to as a preamble, although other terms may also be used.

As a network device receives a frame, it continuously compares the incoming data stream with the known pattern.

To guarantee successful detection and timing synchronization, the preamble should be sufficiently long. However, this poses a challenge for wireless devices with a limited power source. Many devices in current wireless networks either rely on scarce energy resources, such as small batteries, or harvest energy from the environment.

A long preamble may be problematic because every frame that the wireless devices transmits must start with this preamble. Thus, the longer the preamble, the more energy is consumed. In contrast, a short preamble may make reliable identification of the preamble problematic.

Therefore, it would be advantageous to find a system and method to determine the length of the preamble to maximize energy efficiency without compromising frame detection capabilities at the receiver. Further, it would be beneficial if there were a system and method to determine an optimal detection threshold to maximize the likelihood of correctly detecting the preamble.

SUMMARY

A system and method for determining an optimal configuration of the preamble for use in a wireless network is disclosed. The system and method use the calculated or given channel bit error rate to determine this configuration. There are two important parameters associated with the preamble; its length and the detection threshold. The detection threshold is a measure of how many bits can be incorrect while still detecting the preamble. The optimal value of the detection threshold is a trade off between false positives and false negatives. In some embodiments, the system uses the channel bit error rate to determine these parameters. In certain embodiments, the detection threshold can be implemented by the receiver without knowledge of the transmitter. By optimizing the configuration of the preamble, the reliability of communications is minimally impacted while power consumption of the network devices is reduced by minimizing the length of the preamble.

According to one embodiment, a method of improving detection an incoming frame by a receiver on a wireless network, wherein the incoming frame comprises a preamble which is used by the receiver to detect the incoming frame, is disclosed. The method comprises estimating a channel bit error rate of the wireless network using the receiver; determining a detection threshold based on the estimated channel bit error rate; calculating a Hamming distance between the incoming preamble and the predetermined value of the preamble; and detecting an incoming frame whenever the Hamming distance is less than the detection threshold. In certain embodiments, the detection threshold increases with increasing channel bit error rate. In certain embodiments, the detection threshold is selected to maximize a probability of true detection. In a further embodiment, the probability of true detection is determined by calculating a probability of false positives and a probability of false negatives. In some embodiments, the detection threshold is determined using on a look up table.

According to another embodiment, a network device for use on a wireless network is disclosed. The network device comprises a network interface, comprising a preamble detection circuit; a processing unit; a memory device in communication with the processing unit, containing instructions, which when executed by the processing unit, allow the network device to: estimate a channel bit error rate of the wireless network; determine a detection threshold based on the estimated channel bit error rate; and store a value of the detection threshold in the preamble detection circuit; wherein the preamble detection circuit calculates a Hamming distance between an incoming preamble and the predetermined value of the preamble and detects an incoming frame whenever the Hamming distance is less than the detection threshold. In certain embodiments, the preamble detection circuit comprises a shift register to load bits from the incoming preamble; a comparator to compare the contents of the shift register to a predetermined value and determine a Hamming distance between the contents of the shift register and the predetermined value; a register to store the value of the detection threshold; and a comparator to compare the Hamming distance to the detection threshold. In some embodiments, the processing unit determines the detection threshold using a look up table stored in the memory device. In certain embodiments, the detection threshold increases with increasing channel bit error rate. In certain embodiments, the detection threshold is selected to maximize a probability of true detection. In a further embodiment, the probability of true detection is determined by calculating a probability of false positives and a probability of false negatives.

According to another embodiment, a method for improving detection of an incoming frame transmitted from a transmitter to a receiver on a wireless network, wherein the incoming frame comprises a preamble which is used by the receiver to detect the incoming frame, is disclosed. The method comprises estimating a channel bit error rate of the wireless network; determining, at the transmitter, a desired length of the preamble based on the channel bit error rate; communicating the desired length of the preamble to the receiver; and transmitting a frame from the transmitter to the receiver using the desired length of the preamble. In certain embodiments, the channel bit error rate is estimated by the receiver and transmitted to the transmitter. In a further embodiment, the channel bit error rate is piggybacked on an acknowledgement packet. In some embodiments, the desired length of the preamble is communicated to the receiver using a management and control command. In certain embodiment, the method also comprises determining, at the receiver, a detection threshold based on the estimated channel bit error rate and the desired preamble length.

According to another embodiment, a network device for use on a wireless network is disclosed. The network device comprises a network interface, comprising a preamble generator; a processing unit; a memory device in communication with the processing unit, containing instructions, which when executed by the processing unit, allow the network device to: determine a desired length of a preamble for an outgoing frame based on a channel bit error rate of the wireless network; and store a value of the desired length in the preamble generator; wherein the network device transmits frames to a receiver having a preamble of the desired length using the network interface. In certain embodiments, the network device transmits a message to the receiver, indicating the desired length, prior to transmitting frames having the preamble of the desired length. In certain embodiments, the network device receives the channel bit error rate from the receiver.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1A:
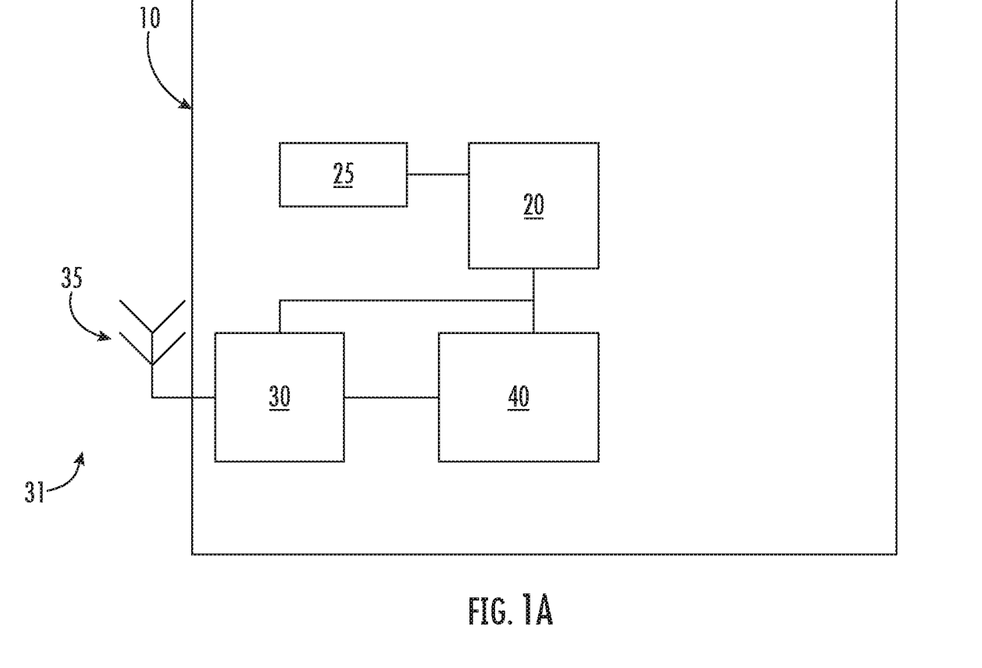
FIG. 1A is a block diagram of a representative network device.
Figure 1B:
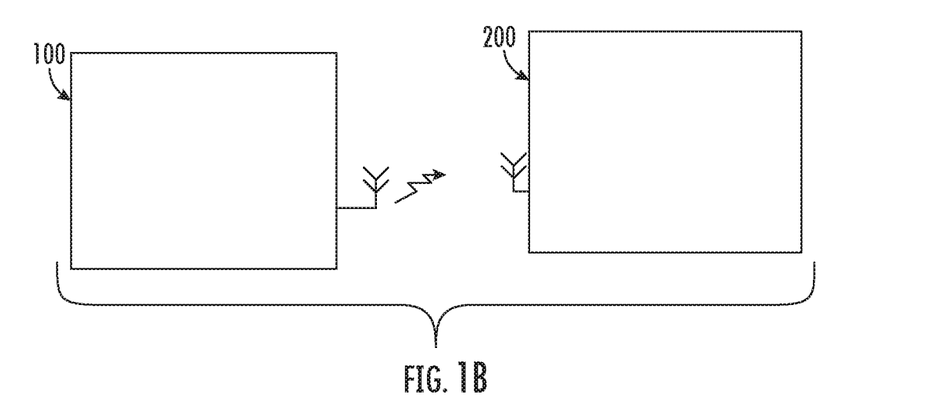
FIG. 1B shows a transmitter and a receiver according to one embodiment.

FIG. 1A shows a block diagram of a representative network device 10. This network device may serve as a transmitter 100 or a receiver 200, as shown in FIG. 1B.

As shown in FIG. 1A, the network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The network device 10 also includes a network interface 30, which may be a wireless interface including an antenna 35. The network interface 30 may support any wireless network, such as Wi-Fi, networks utilizing the IEEE 802.15.4 specification, such as Zigbee, networks utilizing the IEEE 802.15.6 specification, and wireless smart home protocols, such as Z-Wave. In other embodiments, the network interface 30 may support a wired network, such as Ethernet. The network interface 30 is used to allow the network device to communicate with other devices disposed on the network 31.

The network device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other nodes in the network 31. Although not shown, the network device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1A. The second computer readable media may be a CDROM, or a different memory device, which is located remote from the network device 10. The instructions contained on this second computer readable media may be downloaded onto the memory device 25 to allow execution of the instructions by the network device 10.

While the processing unit 20, the memory device 25, the network interface 30, and the second memory device 40 are shown in FIG. 1A as separate components, it is understood that some or all of these components may be integrated into a single electronic component. Rather, FIG. 1A is used to illustrate the functionality of the network device 10, not its physical configuration.

Figure 2:
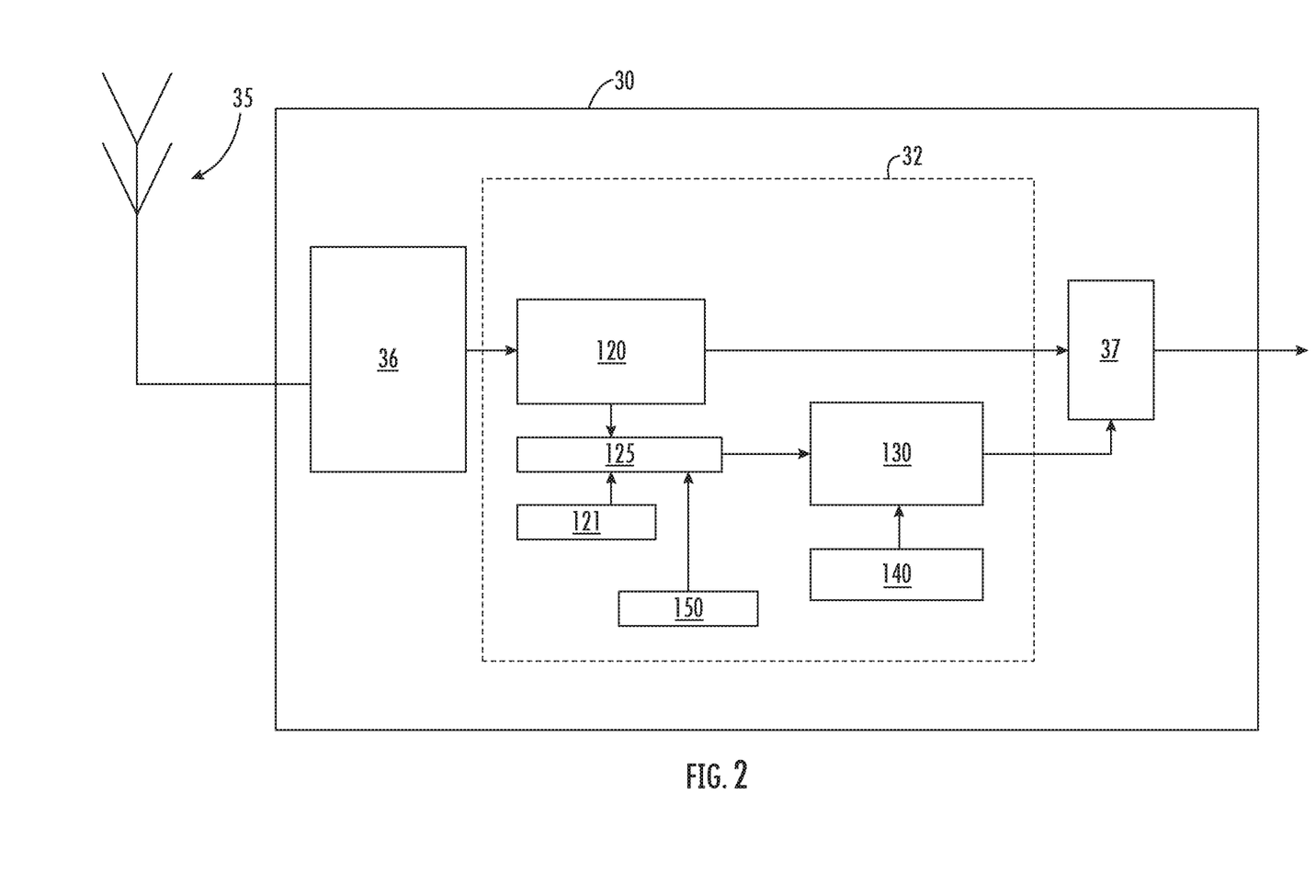
FIG. 2 shows a block diagram of the preamble detection circuit.

As shown in FIG. 2, a preamble detection circuit 32 may be disposed within the network interface 30. The network interface 30 also comprises a demodulation circuit 36 that receives the wireless signals and transforms those signals to a string of digital values. The network interface 30 also comprises a frame synchronization circuit 37. The demodulation circuit 36 may comprise a plurality of components.

For example, the wireless signals first enter the network interface 30 through antenna 35. The antenna 35 may be in electrical communication with a low noise amplifier (LNA) disposed in the demodulation circuit 36. The LNA receives a very weak signal from the antenna 35 and amplifies that signal while maintaining the signal-to-noise ratio (SNR) of the incoming signal. The amplified signal is then passed to a mixer. The mixer is driven by a local oscillator, which provides two phases to the mixer. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer are then fed into programmable gain amplifier (PGA). The PGA amplifies the $I_m$ and $Q_m$ signals by a programmable amount. These amplified signals are referred to as $I_g$ and $Q_g$. The amplified signals, $I_g$ and $Q_g$, are then fed from the PGA into an analog to digital converter (ADC). The ADC then converts these analog signals to digital signals, $I_d$ and $Q_d$. These digital signals may then pass through a channel filter where they are converted to a string of digital values.

The string of digital values exit the demodulation circuit 36 and may enter the preamble detection circuit 32. The preamble detection circuit 32 may comprise a shift register 120, one or more comparators, and several registers used to contain parameters used by the preamble detection circuit 32. The string first enters a shift register 120. The bits contained in the shift register 120 are compared to a predetermined pattern 121 using a bitwise comparator 125. The predetermined pattern 121 is the correct preamble pattern. The bitwise comparator 125 compares bits in the shift register 120 with a corresponding bit in the predetermined pattern 121. The output of the bitwise comparator 125 is an indication of the difference between the contents of the shift register 120 and the predetermined pattern 121, also referred to as Hamming distance. In certain embodiments, the Hamming distance may be represented as a number, although other representations are also possible.

The detection threshold may be disposed in a register 140, which may be written by the processing unit 20. Thus, the detection threshold may be modified by the processing unit 20 as desired.

The output of the bitwise comparator 125, which represents the Hamming distance, is then compared to the value of the detection threshold contained in the register 140 using comparator 130. If the Hamming distance is less than the value of the detection threshold, the comparator 130 indicates that a frame is detected. If the Hamming distance is greater than the value of the detection threshold, the comparator 130 indicates that no frame has been detected. The output of the comparator 130 and the output from the shift register 120 may be used by a frame synchronization circuit 37. This frame synchronization circuit 37 aligns the incoming bit stream from the shift register 120 into bytes of data.

According to one embodiment, the processing unit 20 modifies the register 140 containing the detection threshold based on the channel bit error rate.

There are two types of errors that can arise that affect the selection of the detection threshold. Type 1 errors, also known as "false positive", occur when an incoming frame is detected, while there is no true frame. In other words, Type 1 errors occur when comparator 130 indicates a frame is detected, while in actuality, no frame has been received. Type 2 errors, also known as "false negative", occur when an actual incoming frame is not detected. In other words, Type 2 errors occur when comparator 130 does not indicate a frame is detected, while in actuality, a frame has been transmitted.

Type 1 errors occur more frequently when the allowable Hamming distance is too large. Conversely, type 2 errors occur when the allowable Hamming distance is too small. Thus, the selection of the detection threshold is a tradeoff between these two types of errors.

The optimal value of this detection threshold can be calculated. First, a set of variables is defined as follows:

| FPR | false positive ratio |
| L | preamble length |
| PPH | probability of positive hypothesis |
| ε | channel's bit error probability |
| PTP | probability of true positive |
| PTD | probability of true detection |
| ρ | detection threshold |

The false positive ratio (FPR) defines the probability of a detection of a frame when in actuality no frame is received. In other words, this is the probability of a "false positive" or Type 1 error as a function of detection threshold. This ratio can be defined as the number of possible patterns that have a Hamming distance less than the detection threshold (except the actual pattern), divided by the total number of possible patterns. This can be expressed as shown below:

$$FPR = \frac{\sum_{k=1}^{\rho} \binom{L}{k}}{2^L}$$

Since FPR defines the probability of false positives, the complement of this values represents the probability of a true positive. In other words, the probability of a true positive is defined as:

$PTP = 1 - FPR$

Figure 3:
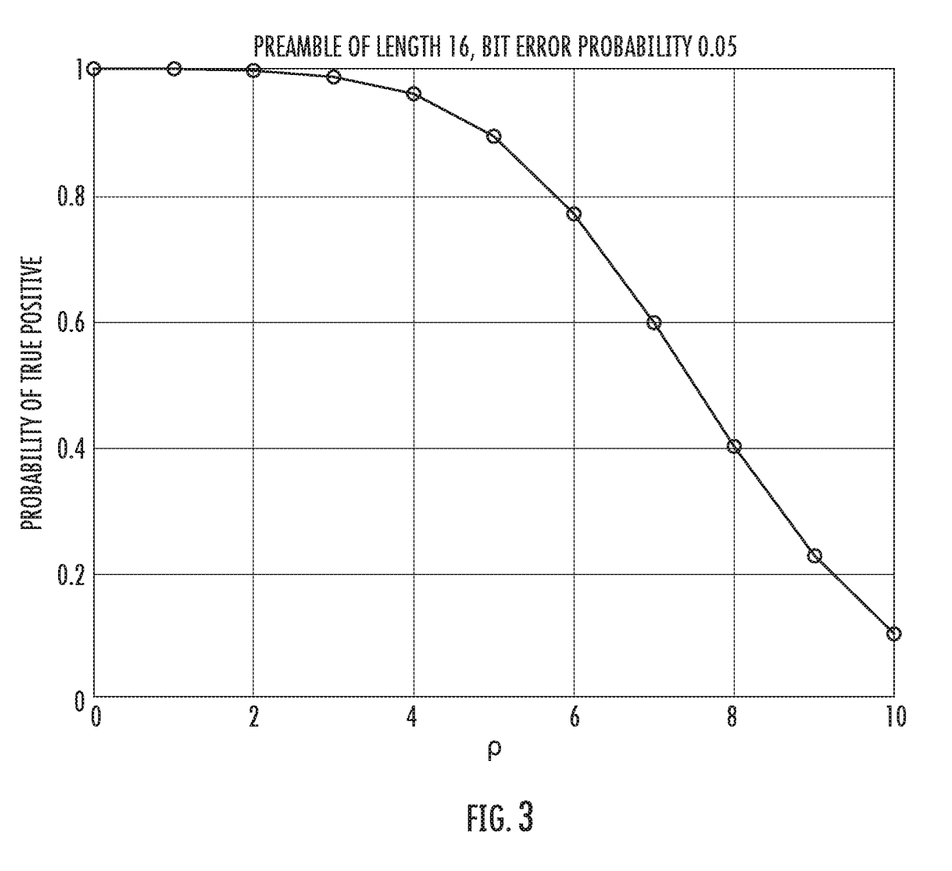
FIG. 3 is a representative graph representing the probability of a true positive as a function of detection threshold.

As can be seen in the above equations, the FPR and consequently the PTP are affected by the selection of the detection threshold (ρ). FIG. 3 shows the relationship between PTP and detection threshold. As ρ increases, the probability of correctly detecting a packet decreases. This graph was created using a preamble length of 16 bits.

Type 2 errors represent the probability of a false negative. This occurs more frequently when the detection threshold is set too low, so that actual preambles are discarded because the Hamming distance is too great. In this case, the probability of a positive hypothesis can be given by the following equation:

$$PPH = \sum_{k=1}^{\rho} \binom{L}{k} \varepsilon^k (1-\varepsilon)^{L-k}$$

In this equation, the right side represents the probability of having any k bits incorrect and the rest of the bits correct. Thus, the total probability of a true hypothesis can be given as the sum of all such probabilities from k equals 0 to k equals the detection threshold.

Figure 4:
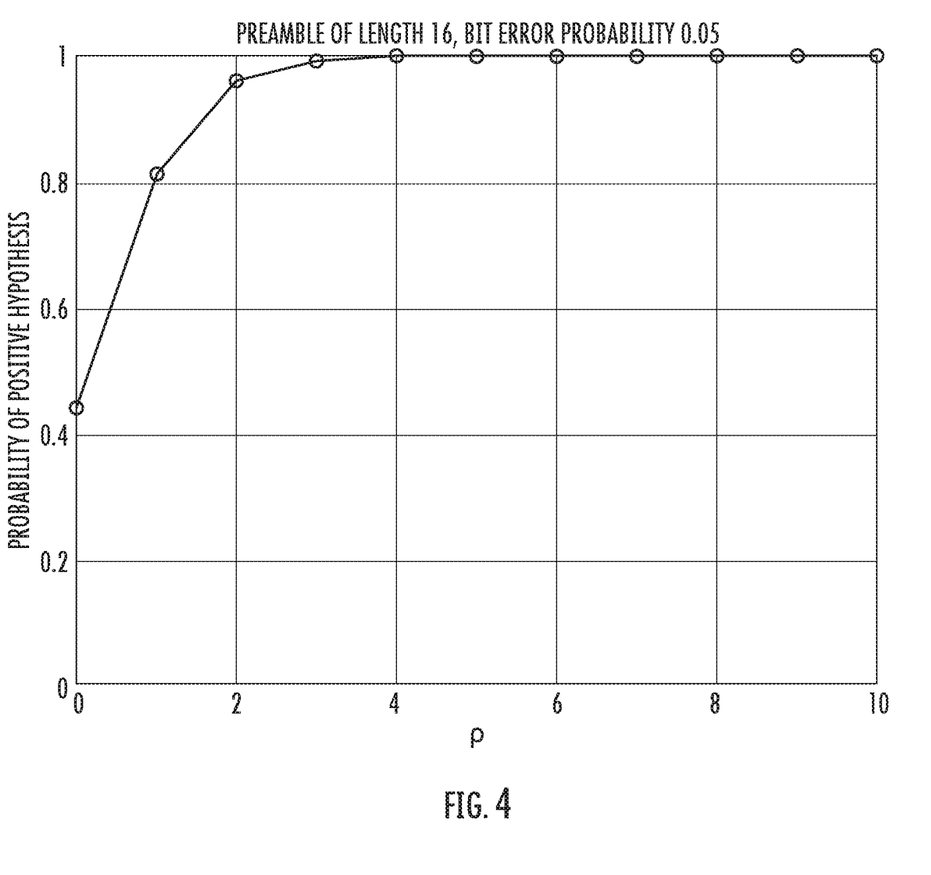
FIG. 4 is a representative graph representing the probability of positive hypothesis as a function of detection threshold.

Note that this equation is a function of detection threshold (ρ), as well as a function of the channel bit error rate (ε). A graph of the probability of positive hypothesis is shown in FIG. 4. This graph was created using a preamble length of 16 and a channel bit error probability of 0.05.

Figure 5:
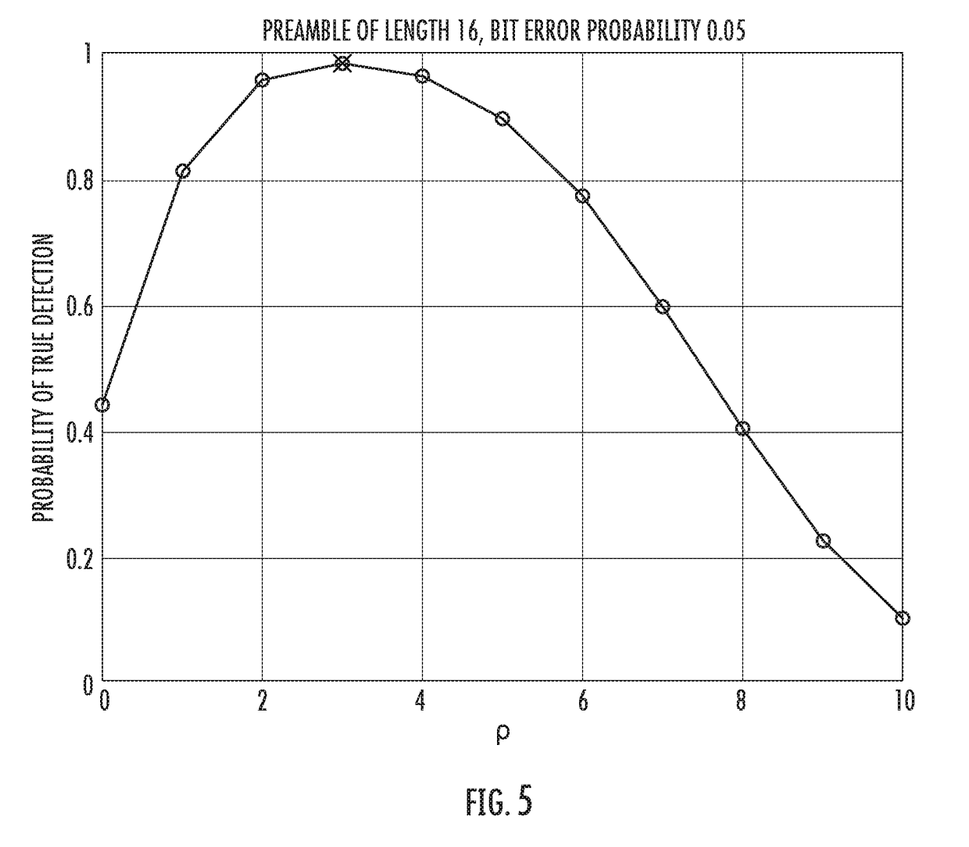
FIG. 5 is a representative graph showing the probability of a true detection as a function of the detection threshold.

The product of these two graphs yields the probability of true detection (PTD), which is shown in FIG. 5. The probability of true detection is given:

$PTD = PPH * PTP$

As can be seen, there is an optimal value of the detection threshold (ρ*) that maximizes PTD. This optimal value changes as a function of channel bit error rate.

Figure 6:
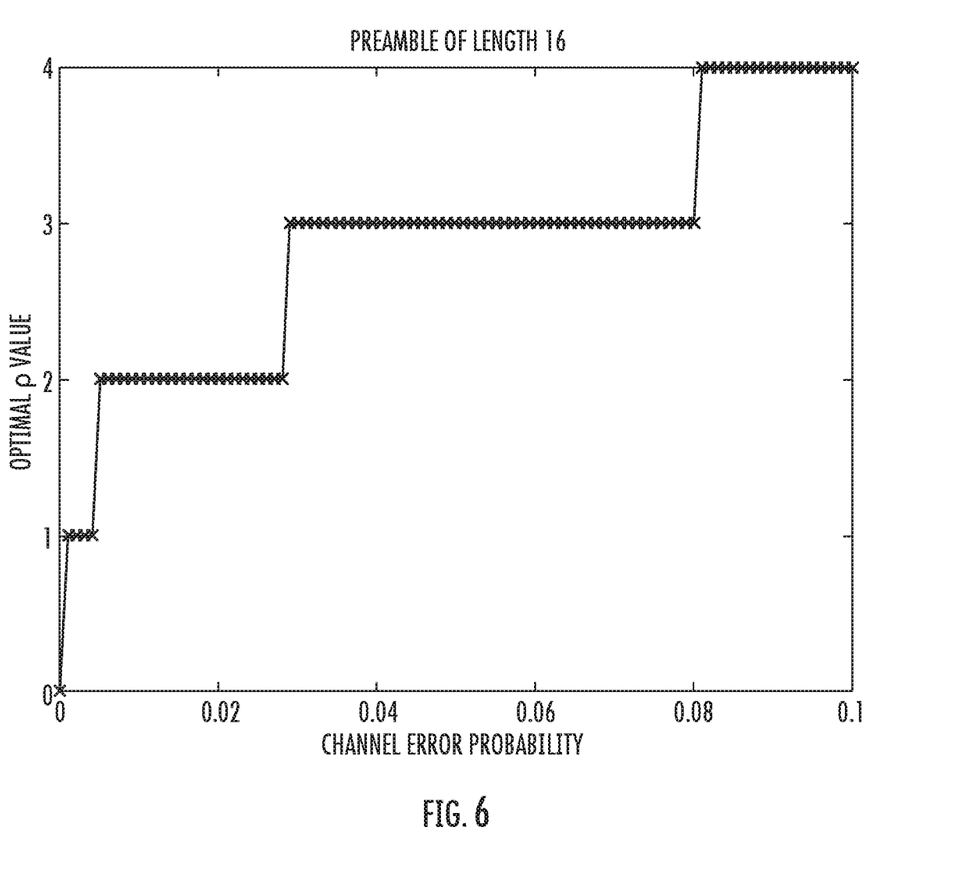
FIG. 6 is a graph showing the optimal detection threshold as a function of channel bit error rate.

Consequently, as shown in these graphs, there is an optimal value of the detection threshold as a function of preamble length and channel bit error rate. This procedure can be performed for a plurality of different channel bit error probabilities and a lookup table can be created using these results. Such a table or graph gives the optimal threshold ρ with respect to a given channel bit error probability. A representative graph showing the optimal value for the detection threshold (ρ) as a function of channel bit error rate (ε) is shown in FIG. 6.

In another embodiment, rather than performing the calculations described above, the memory device 25 may store a table that associated channel bit error rate (ε) to threshold detector (ρ). For example, a lookup table, like that shown in Table 1, may be created and stored in memory device 25.

TABLE 1

| Channel bit error range | Optimal detection threshold |
| --- | --- |
| $0 \leq \varepsilon < \varepsilon_1$ | $\rho^* = \rho_1$ |
| $\varepsilon_1 \leq \varepsilon < \varepsilon_2$ | $\rho^* = \rho_2$ |
| $\varepsilon_2 \leq \varepsilon < \varepsilon_3$ | $\rho^* = \rho_3$ |
| $\varepsilon_3 \leq \varepsilon < \varepsilon_4$ | $\rho^* = \rho_4$ |

Figure 7:
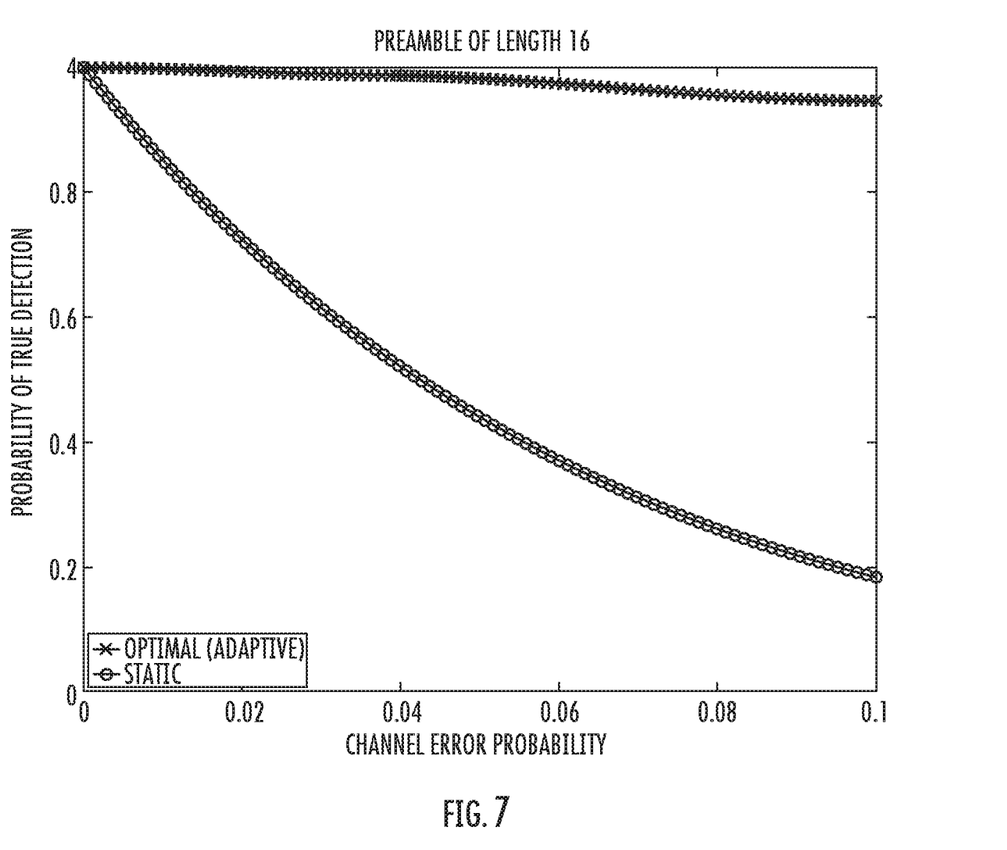
FIG. 7 is a graph showing the impact of an adaptive detection threshold as a function of channel bit error rate.

To demonstrate the benefits of this approach, a simulation was performed that estimated the probability of true detection (PTD) using a 16 bit preamble at a variety of channel bit error rates. In one test, the algorithm defined above was used to determine the value of the detection threshold to be used. In the comparative test, a predetermined value of the detection threshold was used. The results of this simulation are shown in FIG. 7. Note that as the channel bit error rate increases, the static detection threshold was much less effective in detecting the actual frames. In contrast, the PTD of the adaptive algorithm described herein decreased only slightly as the channel bit error rate reaches 0.1. In other words, an adaptive detection threshold is much more effective in correctly detecting an incoming frame than a system that utilizes a fixed or static detection threshold.

To implement this algorithm and system, the channel bit error rate must be estimated. The receiver 200 (as shown in FIG. 1B) typically calculates the channel bit error rate. There are several approaches to estimate the channel bit error rate that can be categorized into two classes: blind approaches and the schemes that rely on symbols a-priori known by both transmitter 100 and the receiver 200. For example, a known pattern may be sent from the transmitter 100 to the receiver 200, and the receiver 200 may count the number of bits that were incorrectly received. This number, divided by the total number of bits transmitted, results in an estimation of the channel bit error rate. Of course, other methods are also possible. The specific method used to estimate the channel bit error rate is not limited by this disclosure; any known or newly derived mechanism may be used.

In certain embodiments, the channel estimation may only be performed by the receiver 200. In some embodiments, the transmitter 100 does not have any indication of the channel bit error rate. In other embodiments, the transmitter 100 may also have an indication of the channel bit error rate. In one embodiment, this information may be supplied to the transmitter 100 by piggy-backing this information in the positive/negative acknowledgment messages that are fed back from the receiver 200 to the transmitter 100. Consequently, the transmitter 100 does not need to perform this task independently. However, in other embodiments, the transmitter 100 can also perform channel estimation (independently) based on the received signal from the receiver 200, such as by using parts or the entirety of the acknowledgment messages.

In certain applications, such as where the transmitter 100 and receiver 200 are deployed in fixed locations, the channel bit error rate is not heavily influenced by fast fading effects and remains almost static. Therefore, in these embodiments, it is not necessary to perform channel estimation frequently.

Figure 10:
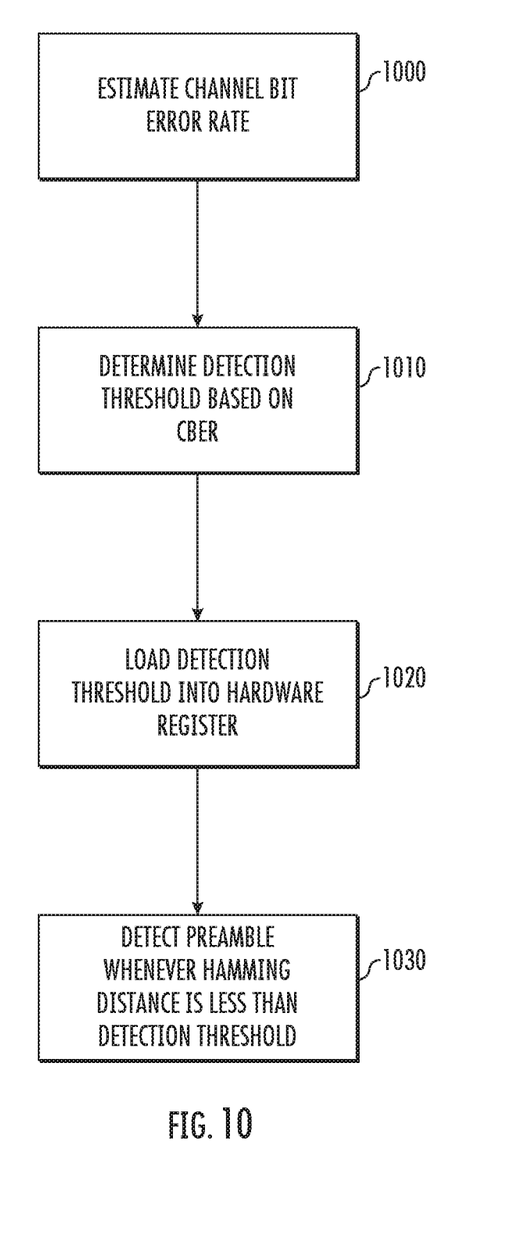
FIG. 10 illustrates a representative flowchart showing the operation of the receiver according to one embodiment.

Thus, the network device 10 that acts as the receiver 200 may execute a set of instructions to establish the optimal detection threshold based on the channel bit error rate. This flowchart is shown in FIG. 10. First, as described above, the processing unit 20 may execute instructions disposed in the memory device 25 to estimate the channel bit error rate (CBER), as shown in Box 1000. Once this has been determined, the processing unit 20 may determine the optimal detection threshold based on the CBER, as shown in Box 1010. This may be performed in a number of ways. In one embodiment, the processing unit 20 indexes into a look up table stored in the memory device 25 to determine the optimal detection threshold. In another embodiment, the processing unit 20 executes a set of instructions that are used to transform the channel bit error rate into an optimal detection threshold. This transformation may be performed using a plurality of conditional statements, effectively performing the same function as a look up table. In yet another embodiment, the processing unit 20 may execute instructions that perform the calculations shown above. Once the optimal detection threshold has been determined, the processing unit 20 may load this value into the register 140 that stores the detection threshold, as shown in Box 1020.

After this value has been loaded, the network device 10 operating as a receiver 200 will optimize its detection of frames, while minimizing the number of false positives and false negatives. In other words, the receiver 200 will detect a preamble whenever the Hamming distance between the incoming bits and the predetermined pattern is less than the value stored in register 140, as shown in Box 1030. Thus, for a given preamble length, the network device 10 will detect the preamble correctly at the maximum achievable rate.

In certain embodiments, the transmitter 100 may be unaware that the receiver 200 has performed this algorithm and has modified its detection threshold.

Additionally, other parameters besides detection threshold can be modified to optimize communications while minimizing the energy consumed by the network device 10. For example, in another embodiment, the size of the preamble may also be varied based on the channel bit error rate. A change in the size of the preamble requires cooperation of both the receiver 200 and the transmitter 100.

Figure 8:
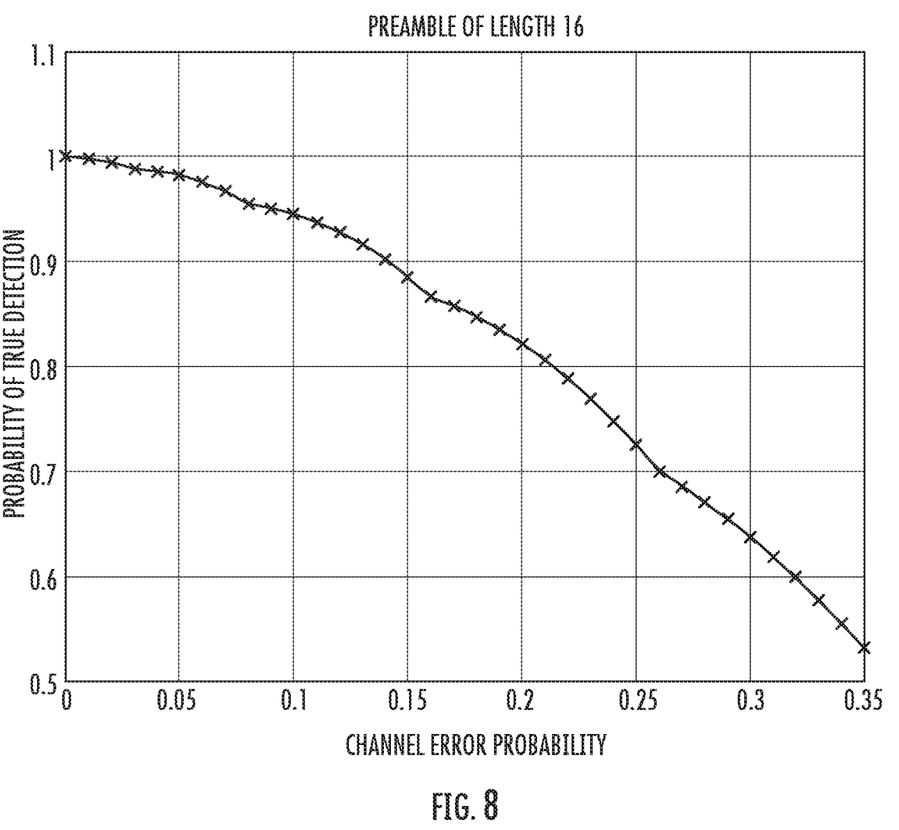
FIG. 8 is a graph showing the probability of true detection as a function of channel bit error rate.

For example, using the techniques described above, the optimal detection threshold can be determined for a given preamble length. For example, in the examples and figures, the preamble has been assumed to be 16 bits. It is understood that the preamble may be shorter or longer than this. FIG. 6 shows that the optimal value of the detection threshold increases with increasing channel bit error rate. In addition, as channel bit error rate increases, the probability of a true detection (PTD) decreases. FIG. 7 shows that the probability of true detection remains over 90% even at channel bit error rates as high as 0.1. FIG. 8 shows the maximum probability of true detection as a function of channel bit error rate as the channel bit error rate grows to even larger values. At values greater than 0.2, the probability of true detection may drop below 80%. This implies that one out of every five frames will not be correctly detected. The maximum probability of true detection will be lower if a shorter preamble, such as an 8 bit preamble, is used.

One approach to compensate for this reduction in PTD is to change the length of the preamble.

For example, as the channel bit error rate increases above a certain level, the transmitter 100 or receiver 200 may determine that a longer preamble may be used to improve the PTD. In certain embodiments, this decision is based on the PTD for the estimated channel bit error rate. For example, after the channel bit error rate is determined, the transmitter 100 and the receiver 200 may utilize a look up table, shown as the one shown in Table 2, to determine the length of the preamble.

TABLE 2

| Channel bit error rate range | Optimal preamble length |
|---|---|
| $0 \leq \varepsilon < \varepsilon_1$ | $L^* = L_1$ |
| $\varepsilon_1 \leq \varepsilon < \varepsilon_2$ | $L^* = L_2$ |
| $\varepsilon_2 \leq \varepsilon < \varepsilon_3$ | $L^* = L_3$ |
| $\varepsilon_3 \leq \varepsilon < \varepsilon_4$ | $L^* = L_4$ |

Unlike the optimization of the detection threshold, both the transmitter 100 and the receiver 200 must be aware of this feature and must select the same preamble length. The channel bit error rate may be determined by the receiver 200 as described above. This channel bit error rate may then be relayed to the transmitter 100 by piggybacking the information on positive/negative acknowledgment messages. Alternatively, the transmitter 100 may determine the channel bit error rate independently.

Figure 9:
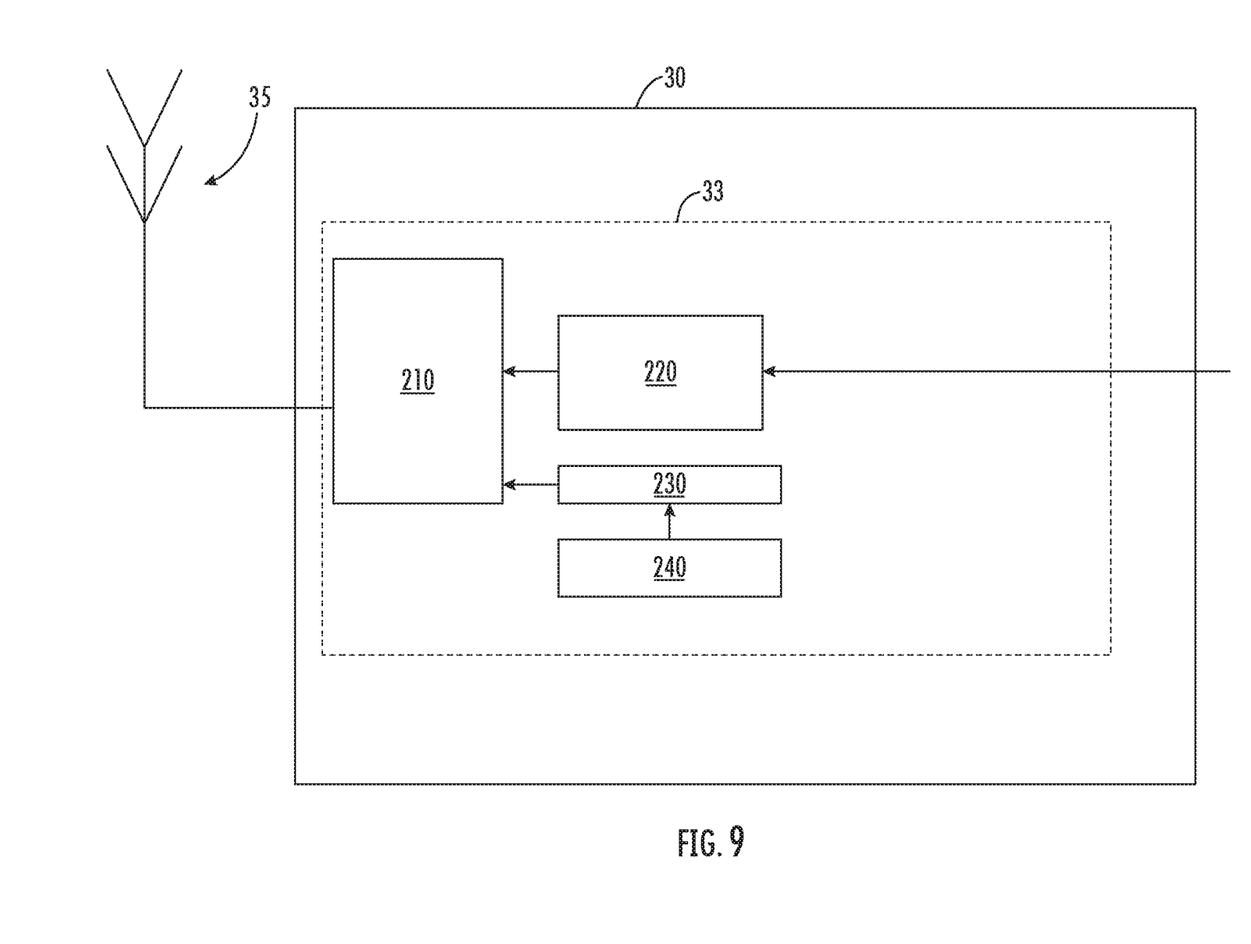
FIG. 9 shows a block diagram of the transmission circuitry in the network interface.

As stated above, the transmitter 100 may have a look up table disposed in its memory device 25, which contains information similar to that shown in Table 2. Based on this information, the transmitter 100 may reconfigure its network interface 30. A representative block diagram of the transmission circuitry 33 within the network interface 30 of the transmitter 100 is shown in FIG. 9. The transmission circuitry 33 includes a data encoder 220 that converts the data to be transmitted into the correct encoded patterns. The transmission circuitry 33 also includes a preamble generator 230. In communication with the preamble generator 230 is a register 240 in which the processing unit 20 of the transmitter 100 loads the desired preamble length. The preamble generator 230 then generates a preamble of the length specified in the register 240. A radio transmitter 210 is used to convert the preamble from the preamble generator 230 and the data from the data encoder 220 to a format that can be transmitted via the antenna 35.

Similarly, the receiver 200 must also be aware of the preamble length. FIG. 2 shows the preamble detection circuit 32 of the receiver 200. This preamble detection circuit 32 may also include a second register 150 that stores the length of the preamble. Based on the value stored in the second register 150, the number of bits from the shift register 120 that are used by the bitwise comparator 125 may be varied.

Like the transmitter 100, the receiver 200 may also have one or more look up tables. In one embodiment, the receiver 200 has the look up tables shown in Tables 1 and 2. The values stored in the Table 2 must be the same for both the transmitter 100 and the receiver 200.

As noted above, the preamble length used by the transmitter 100 and the receiver 200 must be the same in order for the frame to be correctly received. There are many ways in which the information regarding preamble length may be shared between the transmitter 100 and the receiver 200.

In the vast majority of the wireless protocols, there are management and control commands. These management commands are directed toward many issues including network configurations, possible settings like transmit power, and others. In fact, pilot assisted channel estimation can also be one task that is implemented using management commands, where the two nodes have a short dialogue to setup their parameters. Since the preamble length is also a change in the settings, it can be configured using management commands. Once this information is shared, the receiver 200 and transmitter 100 are synchronized with whatever length of preamble which is decided by the transmitter.

In one embodiment, the receiver 200 may estimate the channel bit error rate. This information can be communicated to the transmitter 100, for example, by piggybacking this information in an acknowledgement packet. The transmitter 100 may then use this information about channel bit error rate to determine an appropriate preamble length. The transmitter 100 may then use management commands to supply this length information to the receiver 200.

Figure 11:
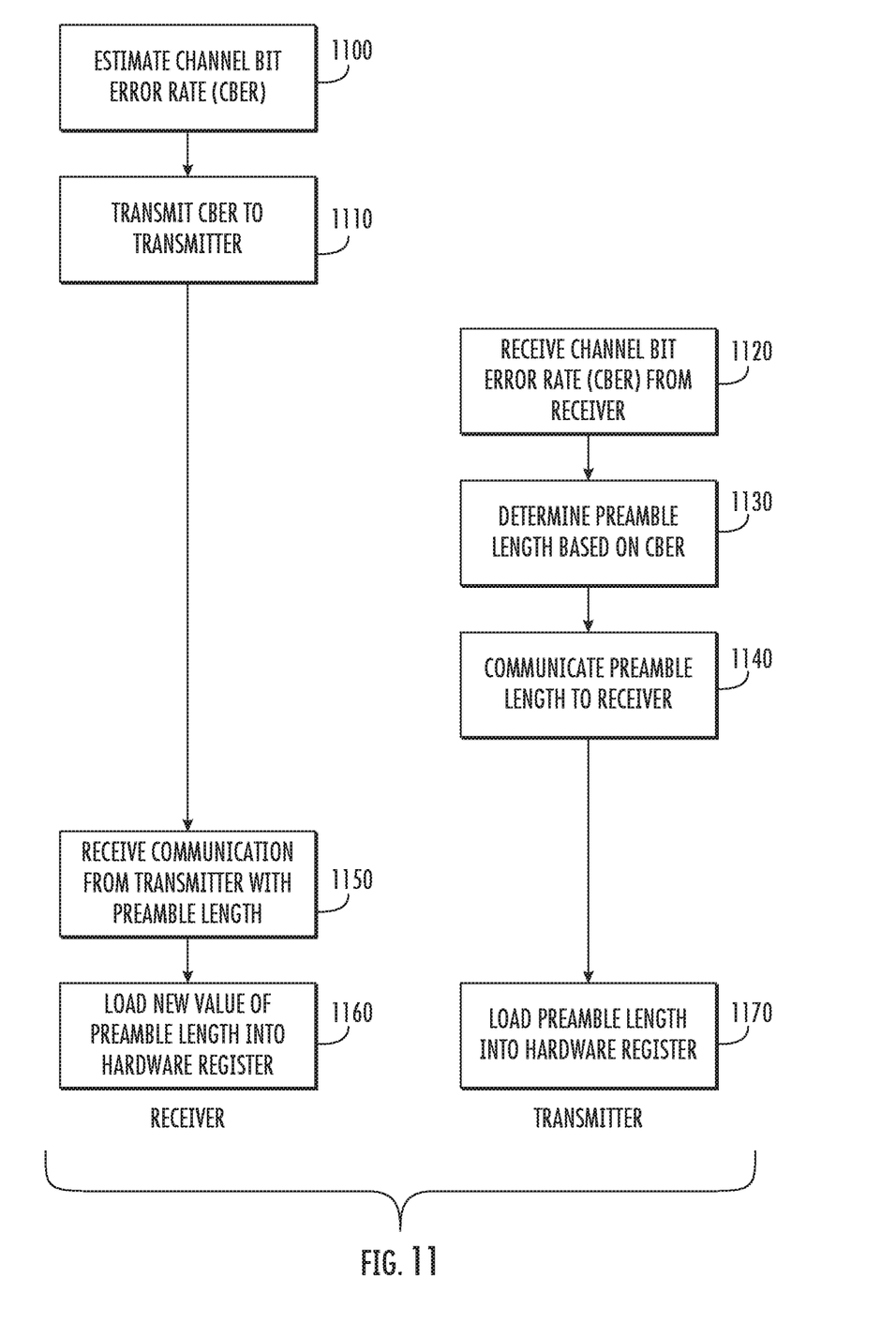
FIG. 11 illustrates representative flowcharts showing the operation of the transmitter and the receiver according to another embodiment.

FIG. 11 shows the operation of the transmitter 100 and the receiver 200 in this embodiment. In both network devices, the instructions to execute these processes may be stored in the memory device and executed by the processing unit. First, the receiver 200 may estimate the channel bit error rate (CBER), as shown in Box 1100. This CBER is then transmitted to the transmitter 100, as shown in Box 1110. As stated above, this may be achieved by piggybacking the CBER in an acknowledgment frame. The CBER is received by the transmitter 100, as shown in Box 1120. The transmitter 100 then determines the preamble based on the received CBER, as shown in Box 1130. This preamble length is then communicated to the receiver 200, as shown in Box 1140. This may be achieved using management commands. The receiver 200 then receives this information, as shown in Box 1150. The processes described above are typically performed in the order described above and shown in FIG. 11, where the top represents the earliest time and the bottom represents the latest time. Once the preamble length has been communicated, the receiver 200 may load the new preamble length into the second register 150, as shown in Box 1160. Additionally, at the same time, before or after, the transmitter 100 may load the new preamble length into register 240, as shown in Box 1170.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for improving detection of an incoming frame by a receiver on a wireless network, wherein the incoming frame comprises a preamble which is used by the receiver to detect the incoming frame, the method comprising:

estimating a channel bit error rate of the wireless network using the receiver;

determining a detection threshold based on the estimated channel bit error rate;

calculating a Hamming distance between the incoming preamble and a predetermined value of the preamble; and detecting an incoming frame whenever the Hamming distance is less than the detection threshold.

2. The method of claim 1, wherein the detection threshold increases with increasing channel bit error rate.

3. The method of claim 1, wherein the detection threshold is selected to maximize a probability of true detection.

4. The method of claim 3, wherein the probability of true detection is determined by calculating a probability of false positives and a probability of false negatives.

5. The method of claim 1, wherein the detection threshold is determined using a look up table.

6. A network device for use on a wireless network, comprising:
   a network interface, comprising a preamble detection circuit for detecting a preamble;
   a processing unit;
   a memory device in communication with the processing unit, containing instructions, which when executed by the processing unit, allow the network device to:
   estimate a channel bit error rate of the wireless network;
   determine a detection threshold based on the estimated channel bit error rate; and
   store a value of the detection threshold in the preamble detection circuit;
   wherein the preamble detection circuit calculates a Hamming distance between an incoming preamble and a predetermined value of the preamble and detects an incoming frame whenever the Hamming distance is less than the detection threshold.

7. The network device of claim 6, wherein the preamble detection circuit comprises:
   a shift register to load bits from the incoming preamble;
   a comparator to compare the contents of the shift register to a predetermined value and determine a Hamming distance between the contents of the shift register and the predetermined value;
   a register to store the value of the detection threshold; and
   a comparator to compare the Hamming distance to the detection threshold.

8. The network device of claim 6, wherein the processing unit determines the detection threshold using a look up table stored in the memory device.

9. The network device of claim 6, wherein the detection threshold increases with increasing channel bit error rate.

10. The network device of claim 6, wherein the detection threshold is selected to maximize a probability of true detection.

11. The network device of claim 10, wherein the probability of true detection is determined by calculating a probability of false positives and a probability of false negatives.

12. A method for improving detection of an incoming frame transmitted from a transmitter to a receiver on a wireless network, wherein the incoming frame comprises a preamble which is used by the receiver to detect the incoming frame, the method comprising:
   estimating a channel bit error rate of the wireless network;
   determining, at the transmitter, a desired length of the preamble based on the channel bit error rate;
   communicating the desired length of the preamble to the receiver;
   transmitting a frame from the transmitter to the receiver using the desired length of the preamble; and
   determining, at the receiver, a detection threshold based on the estimated channel bit error rate and the desired length of the preamble.

13. The method of claim 12, wherein the channel bit error rate is estimated by the receiver and transmitted to the transmitter.

14. The method of claim 13, wherein the channel bit error rate is piggybacked on an acknowledgement packet.

15. The method of claim 12, wherein the desired length of the preamble is communicated to the receiver using a management and control command.

16. The method of claim 12, wherein the desired length of the preamble increases with increasing channel bit error rate.

17. A network device for use on a wireless network, comprising:
   a network interface, comprising a preamble generator circuit;
   a processing unit;
   a memory device in communication with the processing unit, containing instructions, which when executed by the processing unit, allow the network device to:
   determine a desired length of a preamble for an outgoing frame based on a channel bit error rate of the wireless network; and
   store a value of the desired length in the preamble generator circuit;
   wherein the network device transmits frames to a receiver having a preamble of the desired length using the network interface and wherein the network device receives the channel bit error rate from the receiver and the channel bit error rate is piggybacked on an acknowledgement packet.

18. The network device of claim 17, wherein the network device transmits a message to the receiver, indicating the desired length, prior to transmitting frames having the preamble of the desired length.

* * * * *